United States Patent
Ogata et al.

(10) Patent No.: US 10,247,037 B2
(45) Date of Patent: Apr. 2, 2019

(54) TURBOMACHINE

(71) Applicant: Panasonic Intellectual Property Management Co., Ltd., Osaka (JP)

(72) Inventors: Takeshi Ogata, Osaka (JP); Tadayoshi Shoyama, Osaka (JP); Kazuyuki Kouda, Gunma (JP); Hiroshi Hasegawa, Saitama (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 207 days.

(21) Appl. No.: 15/366,739

(22) Filed: Dec. 1, 2016

(65) Prior Publication Data
US 2017/0167286 A1    Jun. 15, 2017

(30) Foreign Application Priority Data
Dec. 11, 2015  (JP) ................. 2015-242406

(51) Int. Cl.
*F04D 29/42* (2006.01)
*F01D 25/24* (2006.01)
(Continued)

(52) U.S. Cl.
CPC ............. *F01D 25/24* (2013.01); *F01D 9/026* (2013.01); *F04D 29/4206* (2013.01);
(Continued)

(58) Field of Classification Search
CPC ............. F05B 2240/14; F05D 2240/14; F05D 2240/126; F01D 29/026; F01D 25/24;
(Continued)

(56) References Cited

U.S. PATENT DOCUMENTS

| 7,086,833 | B2 * | 8/2006 | Cvjeticanin ......... B29C 66/1122 |
| | | | 415/215.1 |
| 9,086,077 | B2 * | 7/2015 | Boufflert ................. F04D 29/42 |
| 2007/0201999 | A1 | 8/2007 | Shibata et al. |
| 2008/0304960 | A1 * | 12/2008 | Cvjeticanin ....... B29C 45/14467 |
| | | | 415/200 |

(Continued)

FOREIGN PATENT DOCUMENTS

| DE | 102008056512 A1 | 5/2010 |
| DE | 102013204144 A1 | 9/2014 |

(Continued)

OTHER PUBLICATIONS

The Extended European Search Report dated May 9, 2017 for the related European Patent Application No. 16202134.9.

*Primary Examiner* — David E Sosnowski
*Assistant Examiner* — Maranatha Boardman
(74) *Attorney, Agent, or Firm* — McDermott Will & Emery LLP (57) ABSTRACT

A turbomachine of the present disclosure includes a rotating shaft, an impeller, a bearing, and a casing. The casing is arranged around the impeller in a circumferential direction of the rotating shaft. A volute is defined in the casing as a passage of a working fluid that is compressed or expanded by rotation of the impeller. The casing includes one or more ribs. The one or more ribs are arranged only in a diagonal area, or the one or more ribs are a plurality of ribs and a degree of reinforcement of the diagonal area by the plurality of ribs is larger than a degree of reinforcement of a tongue portion area by the plurality of ribs.

10 Claims, 7 Drawing Sheets

(51) Int. Cl.
*F01D 9/02* (2006.01)
*F16C 33/10* (2006.01)
*F01D 25/16* (2006.01)
*F16C 17/10* (2006.01)
*F16C 17/26* (2006.01)

(52) U.S. Cl.
CPC ........ *F04D 29/4226* (2013.01); *F16C 33/109* (2013.01); *F01D 25/16* (2013.01); *F05D 2220/30* (2013.01); *F16C 17/10* (2013.01); *F16C 17/26* (2013.01)

(58) Field of Classification Search
CPC ........... F01D 9/02; F01D 17/146; F16M 1/04; F03D 1/0691; F02C 6/12; F04D 29/023
USPC .................................................. 415/204–206
See application file for complete search history.

(56) References Cited

U.S. PATENT DOCUMENTS

2009/0053051 A1* 2/2009 Cvjeticanin ............. B29C 45/14
 415/200
2014/0030070 A1* 1/2014 Beers .................... F04D 25/082
 415/170.1

FOREIGN PATENT DOCUMENTS

| EP | 376225 A2 | 7/1990 |
| JP | 2007-224868 | 9/2007 |
| JP | 2011-133142 | 7/2011 |

* cited by examiner

TURBOMACHINE

BACKGROUND

1. Technical Field

The present disclosure relates to a turbomachine.

2. Description of the Related Art

In a known conventional turbomachine, a bearing that rotatably supports a rotating shaft to which an impeller is fixed is arranged on a front surface side of the impeller provided with a passage of a working fluid.

Figure 5A:
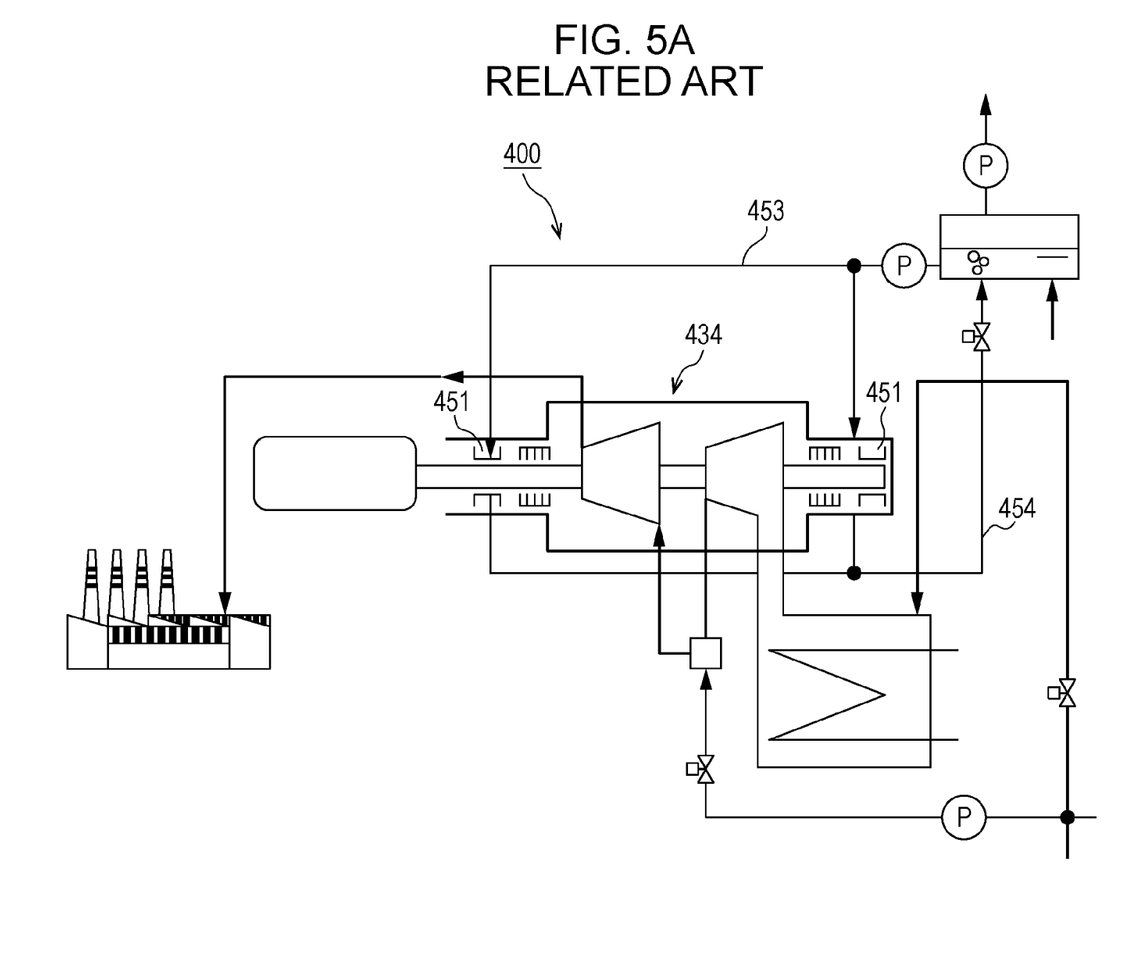
FIG. 5A illustrates a configuration of a heat pump system that includes a conventional turbomachine.
Figure 5B:
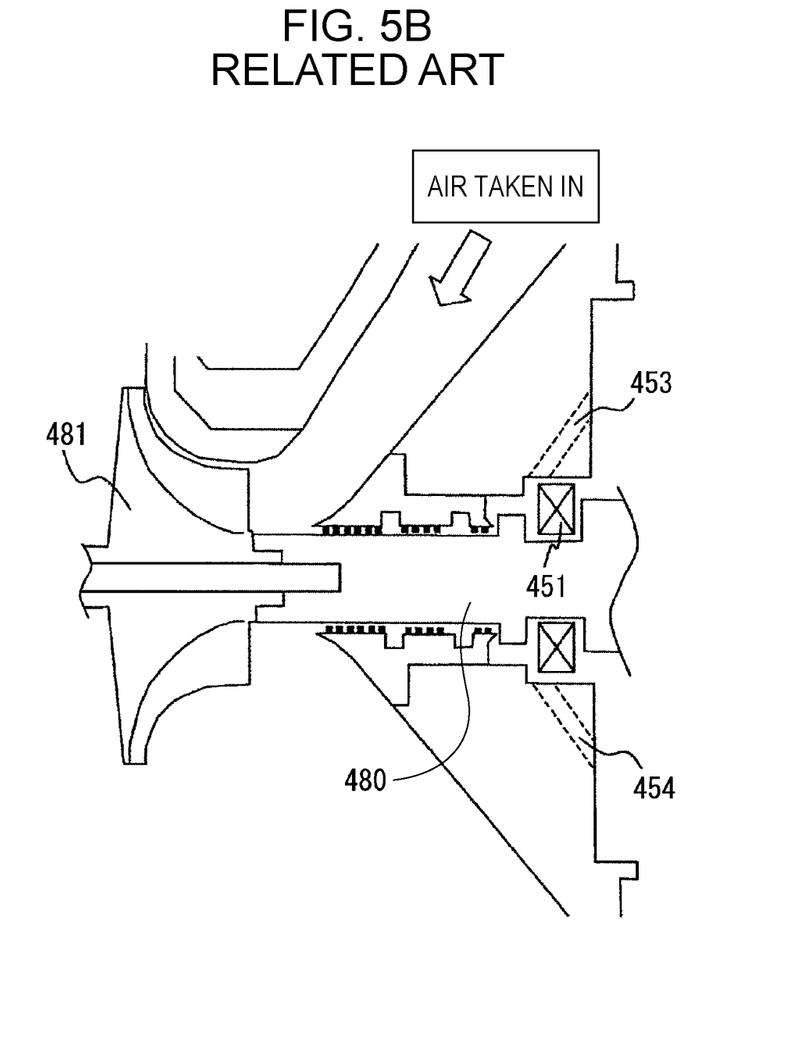
FIG. 5B illustrates a bearing of the conventional turbomachine and the periphery of the bearing through enlargement.

For example, as illustrated in FIG. 5A, Japanese Unexamined Patent Application Publication No. 2007-224868 describes a heat pump system 400, which includes a compressor 434 as a turbomachine. The heat pump system 400 uses water or water vapor as a working fluid. As illustrated in FIG. 5B, in the compressor 434, a rotor axis 480 to which an impeller 481 is connected is supported by bearings 451. Lubricating water supplied from a water supply line 453 absorbs frictional heat while functioning as a lubricant near the bearings 451, and is collected through a water drainage line 454.

Figure 6:
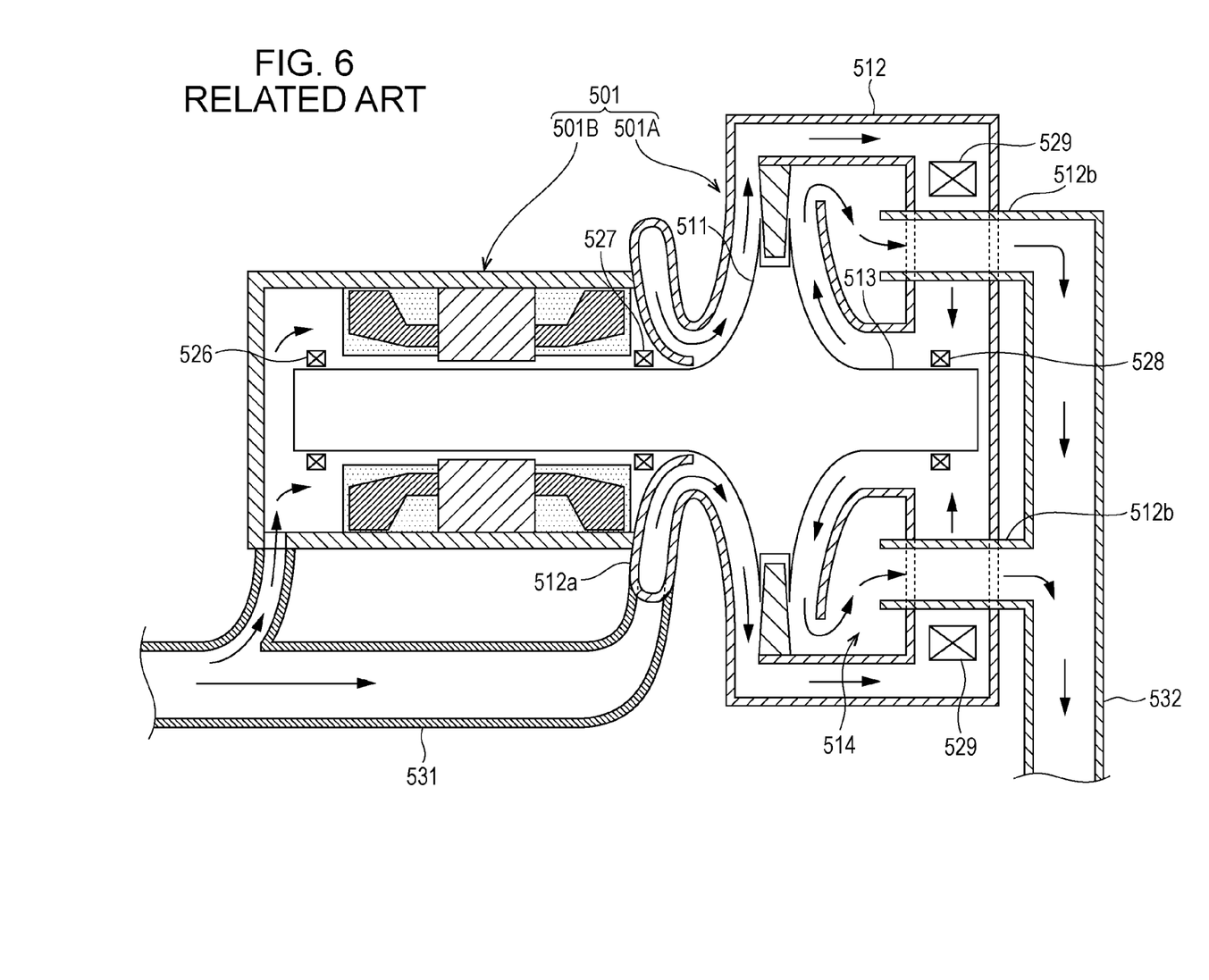
FIG. 6 is a cross-sectional view that illustrates another conventional turbomachine.

As illustrated in FIG. 6, Japanese Unexamined Patent Application Publication No. 2011-133142 discloses an electric compressor 501 as a turbomachine. The electric compressor 501 is configured by integrating a compressor 501A and an electric motor 501B, and a coolant flows as the arrows illustrated in FIG. 6. Water is used as the coolant. The compressor 501A includes an impeller 511 with a rotating shaft 513, and a housing 512. The rotating shaft 513 is rotatably supported by bearings 526, 527, and 528. The housing 512 surrounds the impeller 511 and forms a passage for the coolant. For example, in the housing 512, a space 514 is formed around the periphery of the impeller 511. A coolant that flows into a coolant intake portion 512a from a coolant pipe 531 flows through a side portion of the impeller 511, which is on the side of the electric motor 501B, an intermediate cooler 529, a side portion of the impeller 511, which is on the opposite side of the electric motor 501B, and then through the space 514 and a coolant outlet 512b to flow into a coolant pipe 532.

SUMMARY

One non-limiting and exemplary embodiment provides a turbomachine with high reliability while the techniques described in Japanese Unexamined Patent Application Publication No. 2007-224868 and Japanese Unexamined Patent Application Publication No. 2011-133142 are susceptible of improvement in reliability.

In one general aspect, the techniques disclosed here feature a turbomachine including: a rotating shaft; an impeller that is fixed to the rotating shaft and that compresses or expands a working fluid by rotating around an axial line of the rotating shaft; a bearing that rotatably supports the rotating shaft; and a casing that is arranged around the impeller in a circumferential direction of the rotating shaft and that includes a volute therein, the volute being a fluid passage for the working fluid compressed or expanded by rotation of the impeller, the volute having a cross-sectional area increasing in a flow direction of the working fluid, where the casing has an outer wall that defines the volute, the casing includes one or more ribs that include a first rib and that are arranged on an outer peripheral surface of the outer wall, the outer peripheral surface of the outer wall includes a diagonal area and a tongue portion area, the first rib is arranged in the diagonal area, when seen from an axial direction of the rotating shaft, the tongue portion area includes a tongue portion that is in contact with a most upstream portion and a downstream portion of the volute, when seen from the axial direction of the rotating shaft, a center of the volute is located between the diagonal area and the tongue portion area, and (1) the one or more ribs are arranged only in the diagonal area, or (2) the one or more ribs are a plurality of ribs that are spaced apart from each other in a winding direction of the volute and that each extend over the volute, a degree of reinforcement of the diagonal area by the one or more ribs being greater than a degree of reinforcement of the tongue portion area by the one or more ribs.

The turbomachine according to the present disclosure has high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The techniques described in Japanese Unexamined Patent Application Publication No. 2007-224868 and Japanese Unexamined Patent Application Publication No. 2011-133142 include no reviewing of the influence exerted by the deformation of the casing arranged around the impeller on the reliability of the bearings that rotatably support the rotating shaft. Although the detailed shape of the space 514 according to Japanese Unexamined Patent Application Publication No. 2011-133142 is not obvious, a volute may be formed around the periphery of the impeller in the casing of the turbomachine as a passage for the working fluid that flows out from the impeller. The volute is a spiral space with a passage cross-sectional area, which continuously varies in the circumferential direction of the rotating shaft. A portion in which the volute starts to wind is referred to as a tongue portion.

It is conceivable to position the bearings, which rotatably support the rotating shaft, in relation to the casing in the turbomachine. The casing is deformed by a difference between the pressure of the working fluid that flows in the casing and the pressure in the environment where the casing is placed. Through the present inventors' review, it is found that in this case, the deformation amount of the casing in the axial direction of the rotating shaft in a tongue portion area including the tongue portion tends to be relatively small while the deformation amount of the casing in the axial direction of the rotating shaft in a diagonal area located opposite the tongue portion area in the radial direction of the rotating shaft when seen from the rotating shaft tends to be relatively large. When the bearings are positioned in relation to the casing and the deformation amount of the casing varies in the axial direction of the rotating shaft, the bearings may largely tilt with respect to the rotating shaft and the reliability of the bearings may be decreased. The turbomachine according to the present disclosure has been conceived through such reviews by the present inventors. Herein, the "deformation amount" has a dimension of length.

A first aspect of the present disclosure provides a turbomachine including:
  a rotating shaft;
  an impeller that is fixed to the rotating shaft and that compresses or expands a working fluid by rotating around an axial line of the rotating shaft;
  a bearing that rotatably supports the rotating shaft; and
  a casing that is arranged around the impeller in a circumferential direction of the rotating shaft and that includes a volute therein, the volute being a fluid passage for the working fluid compressed or expanded by rotation of the impeller, the volute having a cross-sectional area increasing in a flow direction of the working fluid, where
  the casing has an outer wall that defines the volute,
  the casing includes one or more ribs that include a first rib and that are arranged on an outer peripheral surface of the outer wall,
  the outer peripheral surface of the outer wall includes a diagonal area and a tongue portion area,
  the first rib is arranged in the diagonal area,
  when seen from an axial direction of the rotating shaft, the tongue portion area includes a tongue portion that is in contact with a most upstream portion and a downstream portion of the volute,
  when seen from the axial direction of the rotating shaft, a center of the volute is located between the diagonal area and the tongue portion area, and
  (1) the one or more ribs are arranged only in the diagonal area, or (2) the one or more ribs are a plurality of ribs that are spaced apart from each other in a winding direction of the volute and that each extend over the volute, a degree of reinforcement of the diagonal area by the one or more ribs being greater than a degree of reinforcement of the tongue portion area by the one or more ribs.

According to the first aspect, (1) only the diagonal area is reinforced by the one or more ribs or (2) the degree of the reinforcement of the diagonal area by the plurality of ribs is greater than the degree of the reinforcement of the tongue portion area by the plurality of ribs. Thus, when the casing is deformed by a difference between the pressure of the working fluid that flows in the casing and the pressure in the environment where the casing is placed, the deformation amount of the casing in the axial direction of the rotating shaft is unlikely to vary in the circumferential direction of the rotating shaft. Accordingly, the bearing positioned in relation to the casing can be prevented from largely tilting with respect to the rotating shaft as the casing is deformed. As a result, not only the reliability of the bearing but also the reliability of the turbomachine can be enhanced. Further, variations in the deformation amount of the casing in the axial direction of the rotating shaft in the circumferential direction of the rotating shaft can be reduced using the one or more ribs without increasing the thickness of the overall outer wall of the casing. Accordingly, the reliability can be enhanced while inhibiting increase in the weight of the turbomachine.

Here, that "(2) the one or more ribs are a plurality of ribs that are spaced apart from each other in the winding direction of the volute and that each extend over the volute, and a degree of reinforcement of the diagonal area by the plurality of ribs is greater than a degree of reinforcement of the tongue portion area by the plurality of ribs" means, for example, that (a) the height of the first rib is larger than the height of the rib arranged closest to the tongue portion in the winding direction of the volute, that (b) in the winding direction of the volute, a dimension of the first rib in the winding direction of the volute is larger than a dimension of the rib arranged closest to the tongue portion in the winding direction of the volute, that (c) a distance between ends of first two ribs of the plurality of ribs, the ends of the first two ribs being located inside in a radial direction of the rotating shaft, the first two ribs being next to each other in the winding direction of the volute in the diagonal area, is smaller than a distance between ends of second two ribs of the plurality of ribs, the ends of the second two ribs being located inside in the radial direction of the rotating shaft, the second two ribs being next to each other in the winding direction of the volute in the tongue portion area, or that (d) the plurality of ribs are arranged more closely in the diagonal area than in the tongue portion area.

In addition to the first aspect, a second aspect of the present disclosure provides the turbomachine, where the bearing may be a fluid bearing that rotatably supports the rotating shaft in a state where a lubricating liquid is between an outer peripheral surface of the rotating shaft and a bearing surface of the bearing. According to the second aspect, clearance that allows the lubricating liquid to form a liquid film is needed between the outer peripheral surface of the rotating shaft and the bearing surface, and the clearance between the outer peripheral surface of the rotating shaft and the bearing surface is relatively large. Accordingly, an allowable tilt of the bearing with respect to the rotating shaft is relatively large, and the possibility of the bearing and the rotating shaft coming into contact with each other when the bearing tilts with respect to the rotating shaft as the casing is deformed can be reduced. As a result, the reliability of the bearing can be further enhanced.

In addition to the second aspect, a third aspect of the present disclosure provides the turbomachine, where the lubricating liquid may be the working fluid in a liquid phase. According to the third aspect, compared to a case where a liquid of a kind different from the working fluid is used as the lubricating liquid, the usage costs of the turbomachine can be reduced. In addition, since the lubricating liquid that is a substance of the kind different from the working fluid is prevented from being mixed with the working fluid and then flowing outside the turbomachine, the possibility of the lubricating liquid exerting an unfavorable influence on a system for which the turbomachine is used can be decreased. Further, it is unlikely that the lubricating liquid will lack in the turbomachine and the reliability of the bearing will be decreased as the result of the lubricating liquid of the kind different from the working fluid flowing out from the turbomachine and then stagnating in a specific portion of the system for which the turbomachine is used. Thus, the reliability of the bearing can be further enhanced.

In addition to any one of the first to third aspects, a fourth aspect of the present disclosure provides the turbomachine, where the working fluid may be water. According to the fourth aspect, since the viscosity of water is lower than the viscosity of oil, at a bearing load similar to the bearing load caused when oil is used as the lubricating liquid, the clearance between the outer peripheral surface of the rotating shaft and the bearing surface needs to be decreased, compared to the case where oil is used as the lubricating liquid. Thus, according to the fourth aspect, the clearance between the outer peripheral surface of the rotating shaft and the bearing surface can be easily decreased and hence, the action by the features of the first aspect to inhibit the tilting of the bearing can be effectively exerted and contact between the bearing and the rotating shaft can be inhibited.

In addition to any one of the first to fourth aspects, a fifth aspect of the present disclosure provides the turbomachine, where
the one or more ribs may be a plurality of ribs that are spaced apart from each other in the winding direction of the volute and that each extend over the volute, and
a height of the first rib may be larger than a height of the rib arranged closest to the tongue portion in the winding direction of the volute. According to the fifth aspect, variations in the deformation amount of the casing in the axial direction of the rotating shaft can be reduced relatively easily by adjusting the height of each of the plurality of ribs.

In addition to any one of the first to fifth aspects, a sixth aspect of the present disclosure provides the turbomachine, where
the one or more ribs may be a plurality of ribs that are spaced apart from each other in the winding direction of the volute and that each extend over the volute, and
in the winding direction of the volute, a dimension of the first rib in the winding direction of the volute may be larger than a dimension of the rib arranged closest to the tongue portion in the winding direction of the volute. According to the sixth aspect, variations in the deformation amount of the casing in the axial direction of the rotating shaft can be reduced relatively easily by adjusting a dimension of each of the plurality of ribs in the winding direction of the volute.

In addition to any one of the first to sixth aspects, a seventh aspect of the present disclosure provides the turbomachine, where
the one or more ribs may be a plurality of ribs that are spaced apart from each other in the winding direction of the volute and that each extend over the volute, and
a distance between ends of first two ribs of the plurality of ribs, the ends of the first two ribs being located inside in a radial direction of the rotating shaft, the first two ribs being next to each other in the winding direction of the volute in the diagonal area, may be smaller than a distance between ends of second two ribs of the plurality of ribs, the ends of the second two ribs being located inside in the radial direction of the rotating shaft, the second two ribs being next to each other in the winding direction of the volute in the tongue portion area. According to the seventh aspect, variations in the deformation amount of the casing in the axial direction of the rotating shaft can be reduced relatively easily by adjusting a distance between ends of the ribs next to each other among the plurality of ribs, which are located inside in the radial direction of the rotating shaft.

In addition to any one of the first to seventh aspects, an eighth aspect of the present disclosure provides the turbomachine, where
the one or more ribs may be a plurality of ribs that are spaced apart from each other in the winding direction of the volute and that each extend over the volute, and
the plurality of ribs may be arranged more closely in the diagonal area than in the tongue portion area. According to the eighth aspect, variations in the deformation amount of the casing in the axial direction of the rotating shaft can be reduced relatively easily by adjusting how closely the plurality of ribs are arranged.

In addition to any one of the first to eighth aspects, a ninth aspect of the present disclosure provides the turbomachine, where
when seen from the axial direction of the rotating shaft, a center of the volute may be defined as a point O,
a half straight line that passes through the tongue portion may be defined as a half straight line L while the point O serves as a base point, and
$-45° \leq \theta2 \leq 45°$ and
$135° \leq \theta1 \leq 225°$, where
when the half straight line L is rotated by an angle $\theta$ while the point O serves as the center and a direction in which the cross-sectional area of the volute increases is positive, $\theta2$ represents an angle at which the tongue portion area and the half straight line L overlap and $\theta1$ represents an angle at which the diagonal area and the half straight line L overlap.

In addition to any one of the first to ninth aspects, a tenth aspect of the present disclosure provides the turbomachine, where
when seen from the axial direction of the rotating shaft, the first rib may overlap an imaginary line that passes through the center of the volute and the tongue portion.

In addition to any one of the first to tenth aspects, an eleventh aspect of the present disclosure provides the turbomachine, where
the one or more ribs may be a plurality of ribs that are spaced apart from each other in the winding direction of the volute and that each extend over the volute, and
the first rib may have a largest height among the plurality of ribs, or the first rib may have a dimension largest in the winding direction of the volute among the plurality of ribs.

An embodiment of the present disclosure is described below with reference to the drawings. The description below relates to an example of the present disclosure and the present disclosure is not limited thereto.

Figure 1:
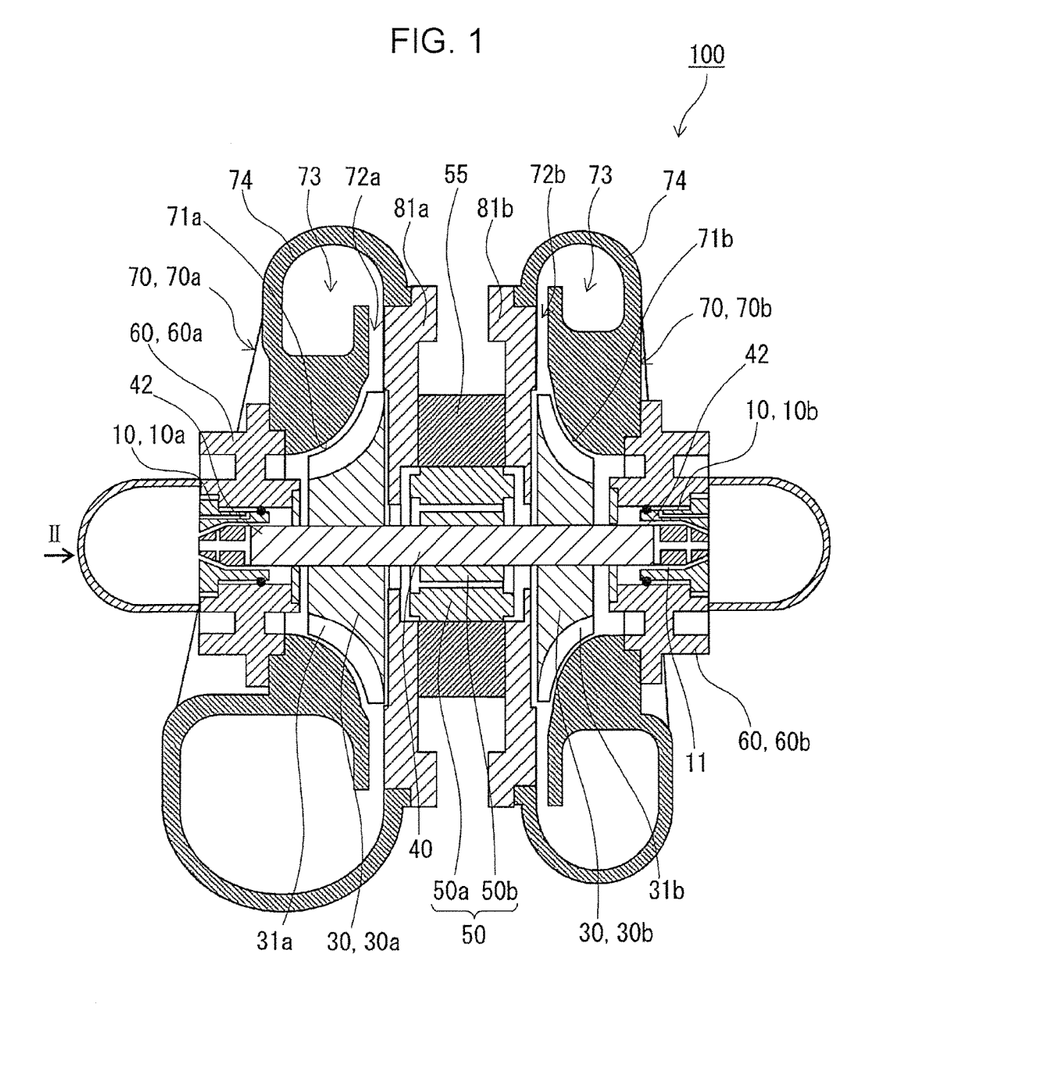
FIG. 1 is a cross-sectional view that illustrates a turbomachine according to an embodiment of the present disclosure.
Figure 2:
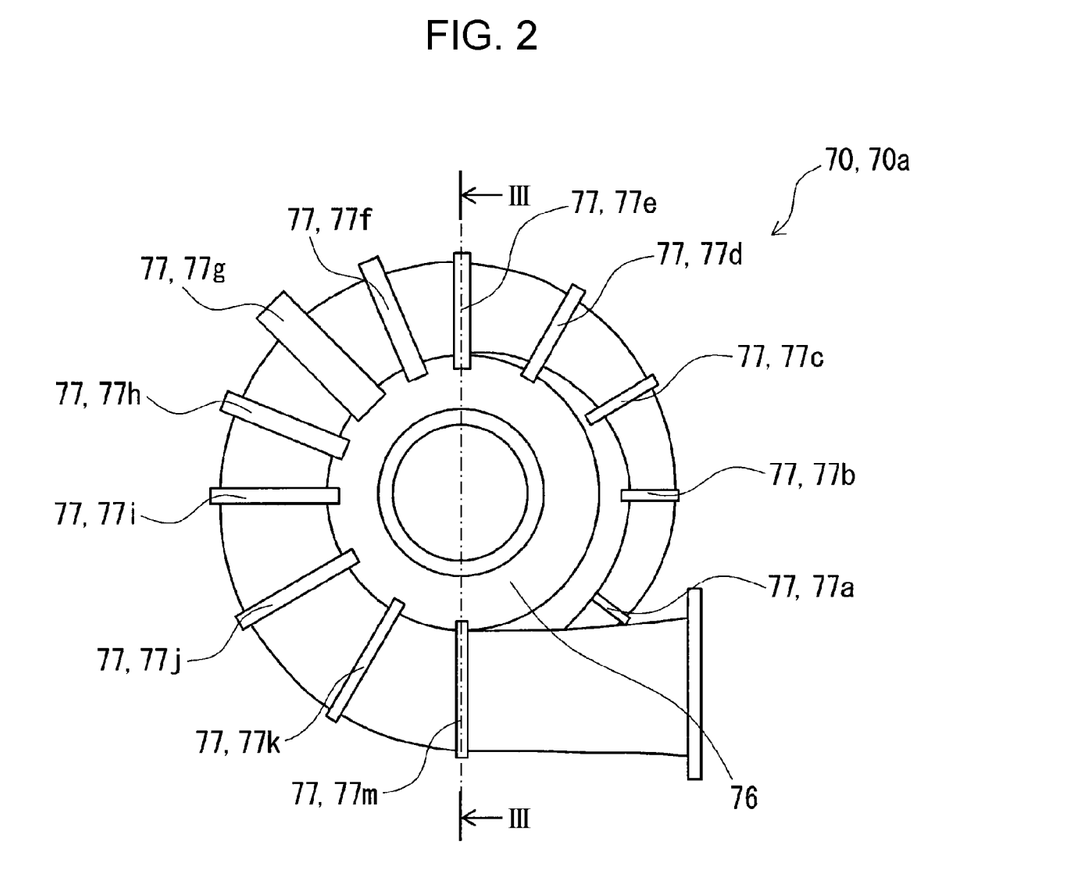
FIG. 2 illustrates a casing of the turbomachine seen from a direction indicated by arrow II in FIG. 1.
Figure 4:
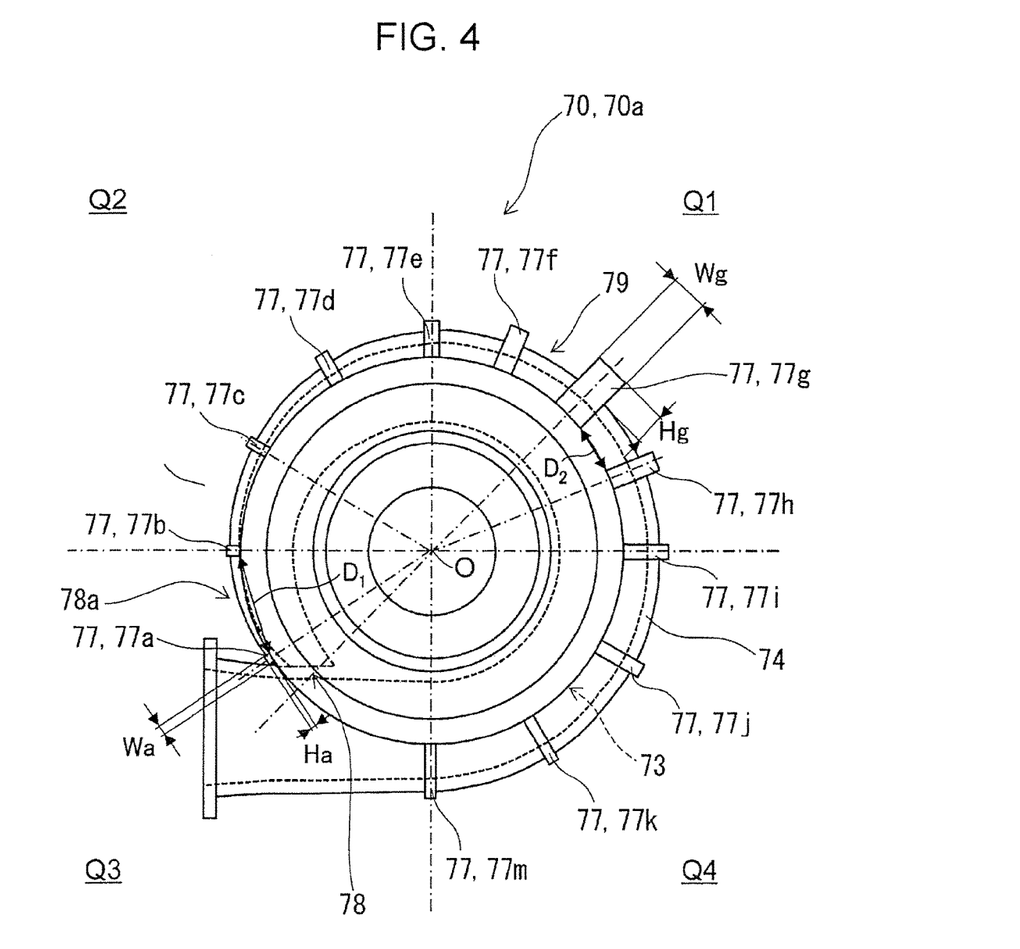
FIG. 4 illustrates the casing of the turbomachine seen from the opposite direction of the direction indicated by arrow II.

As illustrated in FIG. 1, a turbomachine 100 of the present disclosure includes a rotating shaft 40, an impeller 30, a bearing 10, and a casing 70. The impeller 30 is fixed to the rotating shaft 40, and compresses or expands a working fluid by rotating around an axial line of the rotating shaft 40 together with the rotating shaft 40. The bearing 10 rotatably supports the rotating shaft 40. The casing 70 is arranged around the impeller 30 in a circumferential direction of the rotating shaft 40. In the casing 70, a volute 73 is formed as a passage for the working fluid compressed or expanded through the rotation of the impeller 30. The volute 73 has a passage cross-sectional area that increases in the flow direction of the working fluid. As illustrated in FIGS. 2 and 4, the casing 70 includes an outer wall 74 and one or more ribs 77. The outer wall 74 forms the volute 73. The one or more ribs 77 include a first rib 77g and are arranged on an outer peripheral surface of the outer wall 74 in a diagonal area 79. When seen from an axial direction of the rotating shaft 40, a tongue portion 78 is in contact with a most upstream portion and a downstream portion of the volute. In other words, the volute 73 starts to wind in the tongue portion 78.

Further in other words, the tongue portion 78 is located in the most upstream portion of the volute 73. When seen from the axial direction of the rotating shaft 40, a tongue portion area 78a includes the tongue portion 78. When seen from the axial direction of the rotating shaft 40, a center O of the volute is located between the diagonal area 79 and the tongue portion area 78a. The first rib 77g is arranged in the diagonal area 79. The bearing 10 is positioned in relation to the casing 70 in the axial direction of the rotating shaft 40. In other words, the bearing 10 is in indirect contact with the casing 70. The degree of the reinforcement of the diagonal area 79 by the one or more ribs 77 is larger than the degree of the reinforcement of the tongue portion area 78a by the one or more ribs 77.

For example, the turbomachine 100 is a centrifugal turbocompressor. For example, the turbomachine 100 further includes an electric motor 50, an electric motor casing 55, a bearing casing 60, a first coupling member 81a, and a second coupling member 81b. The electric motor 50 includes a stator 50a, which is fixed to the electric motor casing 55, and a rotor 50b, which is fixed to the rotating shaft 40. For example, the turbomachine 100 includes a first bearing 10a and a second bearing 10b as the bearing 10. The rotating shaft 40 includes a cylindrical portion 42, which is rotatably supported by the first bearing 10a and the second bearing 10b in both end portions of the rotating shaft in the axial direction 40. When the turbomachine 100 operates, the working fluid flows from the front side of the impeller 30 toward the impeller 30. The second bearing 10b is arranged opposite the first bearing 10a in the axial direction of the rotating shaft 40 when seen from the impeller 30.

For example, the turbomachine 100 includes a first impeller 30a and a second impeller 30b as the impeller 30. The first impeller 30a is fixed to the rotating shaft 40 between the first bearing 10a and the electric motor 50 in the axial direction of the rotating shaft 40. The second impeller 30b is fixed to the rotating shaft 40 between the second bearing 10b and the electric motor 50 in the axial direction of the rotating shaft 40. The first impeller 30a includes a front surface portion 31a, which faces toward the front side of the first impeller 30a, and the second impeller 30b includes a front surface portion 31b, which faces toward the front side of the second impeller 30b. The first impeller 30a and the second impeller 30b are fixed to the rotating shaft 40 so that the front surface portion 31a and the front surface portion 31b are directed toward opposite sides in the axial direction of the rotating shaft 40. That is, the front side of the first impeller 30a and the front side of the second impeller 30b are in reverse directions.

For example, the turbomachine 100 includes a first casing 70a and a second casing 70b as the casing 70. The first casing 70a is fixed to the electric motor casing 55 via the first coupling member 81a and the second casing 70b is fixed to the electric motor casing 55 via the second coupling member 81b. The first casing 70a includes an inner peripheral surface 71a, which is formed so as to surround the front surface portion 31a of the first impeller 30a on the outside of the first impeller 30a in the radial direction of the first impeller 30a. The second casing 70b includes an inner peripheral surface 71b, which is formed so as to surround the front surface portion 31b of the second impeller 30b on the outside of the second impeller 30b in the radial direction of the second impeller 30b. The first casing 70a is provided with a discharge passage 72a on the outside of the first impeller 30a, which is in the radial direction of the first impeller 30a. The second casing 70b is provided with a discharge passage 72b on the outside of the second impeller 30b, which is in the radial direction of the second impeller 30b. In the first casing 70a, the outer wall 74 forms the volute 73 connected with the discharge passage 72a. In the second casing 70b, the outer wall 74 forms the volute 73 connected with the discharge passage 72b.

Although the material of the casing 70 is not particularly limited, the casing 70 is typically made of steel, such as cast iron or stainless steel, or made of nonferrous metal, such as aluminum or titanium. For example, when the casing 70 is made of stainless steel, the casing 70 exhibits high resistance to corrosion even in using water as the working fluid of the turbomachine 100. As a result, the turbomachine 100 has high reliability. When the casing 70 is made of aluminum, compared to the case where the casing 70 is made of a steel material, the weight of the casing 70 can be greatly reduced. When the casing 70 is made of aluminum, the weight of the turbomachine 100 can be advantageously decreased since the casing 70 is a component that is relatively large in the turbomachine 100.

For example, the turbomachine 100 includes a first bearing casing 60a and a second bearing casing 60b as the bearing casing 60. The first bearing casing 60a is fixed to the first casing 70a and the first bearing 10a is accommodated in the first bearing casing 60a. Thus, the first bearing 10a is positioned in relation to the first casing 70a. The second bearing casing 60b is fixed to the second casing 70b and the second bearing 10b is accommodated in the second bearing casing 60b. Thus, the second bearing 10b is positioned in relation to the second casing 70b.

As the electric motor 50 operates, the first impeller 30a and the second impeller 30b rotate together with the rotating shaft 40 at high speed. Thus, the working fluid on the front side of the first impeller 30a passes through the first impeller 30a and is compressed. The working fluid that has passed through the first impeller 30a and has been compressed passes through the discharge passage 72a and the volute 73 formed in the first casing 70a and is discharged outside the first casing 70a, and then guided to a space on the front side of the second impeller 30b. The working fluid on the front side of the second impeller 30b passes through the second impeller 30b and is further compressed. The working fluid that has passed through the second impeller 30b and has been compressed passes through the discharge passage 72b and the volute 73 formed in the second casing 70b and is discharged outside the turbomachine 100. Since in the turbomachine 100, the first impeller 30a and the second impeller 30b cause the working fluid to be compressed at two stages as described above, the turbomachine 100 can exhibit high compression efficiency and achieve a high pressure ratio.

Figure 3:
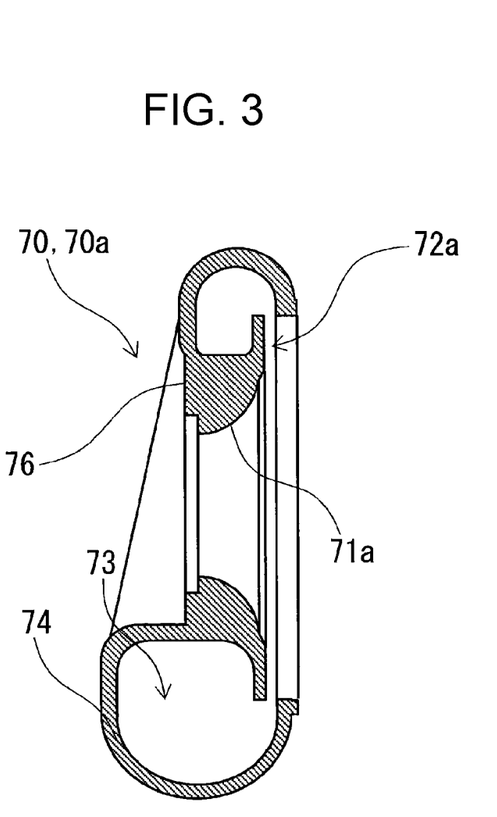
FIG. 3 is a cross-sectional view that illustrates the casing of the turbomachine seen along line III-III in FIG. 2.

As illustrated in FIGS. 2 and 3, the outer wall 74 of the casing 70 has a plane 76 for fixing the first bearing casing 60. As illustrated in FIG. 4, it is assumed to angularly divide the casing 70 into quarters to define a first quadrant Q1, a second quadrant Q2, a third quadrant Q3, and a fourth quadrant Q4 in the circumferential direction of the rotating shaft 40 so that the tongue portion 78 is located angularly in the center of the third quadrant Q3. In this case, for example, part of the casing 70 that belongs to the third quadrant Q3 is defined as the tongue portion area 78a of the casing 70 and part of the casing 70 that belongs to the first quadrant Q1 is defined as the diagonal area 79 of the casing 70.

When the turbomachine 100 operates, the pressure inside the casing 70 is the pressure of the working fluid and the pressure outside the casing 70 is the pressure in an environment where the casing 70 is placed, which is typically atmospheric pressure. A difference between the pressures deforms the casing 70. In particular, a portion of the outer wall 74 of the casing 70 that forms the volute 73 is relatively thin and easily becomes deformed. For example, the thickness of a portion of the outer wall 74 of the casing 70 where no ribs are formed is 5 to 30 mm.

A case where the casing 70 includes none of the ribs 77 or where ribs are uniformly formed on the casing 70 is considered. In this case, when the casing 70 is deformed by the difference between the pressure outside the casing 70 and the pressure inside the casing 70, the deformation amount of the casing 70 in the axial direction of the rotating shaft 40 in the tongue portion area 78a is relatively small. This is because a portion of the casing 70 that extends outward from the inner peripheral surface 71a and the outer wall 74 of the casing 70 are continuous in the tongue portion 78, and the casing 70 in the tongue portion area 78a has a structure that inhibits deformation. In contrast, since the diagonal area 79 is located farthest from the tongue portion area 78a, the deformation amount of the casing 70 in the axial direction of the rotating shaft 40 in the diagonal area 79 is relatively large. Thus, the displacement amount of the plane 76 in the axial direction of the rotating shaft 40 varies in the circumferential direction of the rotating shaft 40. Since the bearing casing 60 is fixed to the plane 76 of the casing 70, the displacement amount of the bearing casing 60 in the axial direction of the rotating shaft 40 also varies in the circumferential direction of the rotating shaft 40. Thus, the bearing 10 accommodated in the bearing casing 60 fixed to the casing 70 tilts with respect to the rotating shaft 40. In this case, when the tilt of the bearing 10 with respect to the rotating shaft 40 is too large, partial contact (end tooth bearing) between the bearing 10 and the rotating shaft 40 may occur or excessive bearing load may locally occur, and the reliability of the bearing 10 may decrease accordingly. It is also conceivable to reduce the deformation amount in the axial direction of the rotating shaft 40 and inhibit the tilting of the bearing 10 by increasing the thickness of the outer wall 74 of the casing 70 and enhancing the overall stiffness of the casing 70. In this case, however, increase in the overall weight of the turbomachine 100 and upsizing of the turbomachine 100 may be caused and the manufacturing costs of the turbomachine 100 may rise.

In contrast, in the turbomachine 100 according to the present disclosure, the degree of the reinforcement of the diagonal area 79 by the one or more ribs 77 is larger than the degree of the reinforcement of the tongue portion area 78a by the one or more ribs 77. Thus, the difference between the deformation amount of the casing 70 in the axial direction of the rotating shaft 40 in the tongue portion area 78a and the deformation amount of the casing 70 in the axial direction of the rotating shaft 40 in the diagonal area 79 is small and the bearing 10 resists tilting with respect to the rotating shaft 40. As a result, the bearing 10 can exhibit high reliability.

The bearing 10 is a fluid bearing for example, and rotatably supports the rotating shaft 40 in a state where a lubricating liquid is between an outer peripheral surface of the rotating shaft 40 and a bearing surface of the bearing 10. In this case, clearance that allows the lubricating liquid to form a liquid film is needed between the outer peripheral surface of the rotating shaft 40 and the bearing surface of the bearing 10, and the clearance between the outer peripheral surface of the rotating shaft 40 and the bearing surface of the bearing 10 is relatively large. Thus, an allowable tilt of the bearing 10 with respect to the rotating shaft 40 is relatively large, and the possibility of the bearing 10 and the rotating shaft 40 coming into contact with each other when the bearing 10 tilts with respect to the rotating shaft 40 as the casing 70 is deformed can be reduced. As a result, the reliability of the bearing 10 can be further enhanced.

When the bearing 10 is a fluid bearing, for example, the lubricating liquid is a liquid-phase working fluid. In this case, compared to a case where a liquid of a kind different from the working fluid is used as the lubricating liquid, the usage costs of the turbomachine 100 can be reduced. In addition, since the lubricating liquid of the kind different from the working fluid is prevented from being mixed with the working fluid and then flowing outside the turbomachine 100, the possibility of the lubricating liquid exerting an unfavorable influence on a system for which the turbomachine 100 is used can be decreased. Further, it is unlikely that the lubricating liquid will lack in the turbomachine 100 and the reliability of the bearing 10 will be lowered as the result of the lubricating liquid of the kind different from the working fluid flowing out from the turbomachine 100 and then stagnating in a specific portion of the system for which the turbomachine 100 is used. Thus, the reliability of the bearing 10 can be further enhanced.

The working fluid of the turbomachine 100 is not particularly limited but for example, is a fluid whose saturated vapor pressure at room temperature, 20° C.±15° C. according to JIS Z 8703 of Japanese Industrial Standards (JIS), is lower than the atmospheric pressure at absolute pressure. Examples of such a fluid include water, alcohol, and a fluid that contains ether as the main ingredient. The working fluid of the turbomachine 100 is water for example. Since the viscosity of water is lower than the viscosity of oil, at a bearing load similar to the bearing load caused when oil is used as the lubricating liquid, the clearance between the outer peripheral surface of the rotating shaft 40 and the bearing surface needs to be decreased, compared to the case where oil is used as the lubricating liquid. Thus, when the working fluid of the turbomachine 100 is water, the clearance between the outer peripheral surface of the rotating shaft 40 and the bearing surface of the bearing 10 can be easily decreased. Accordingly, the action by the above-described features of the turbomachine 100 to inhibit the tilting of the bearing can be effectively exerted, and contact between the bearing 10 and the rotating shaft 40 can be inhibited. Moreover, the turbomachine 100 can operate with pressure lower than the atmospheric pressure and even when the impeller 30 rotates at high speed, a thrust load that occurs is very small. Thus, the bearing load that acts on the bearing supposed to receive the thrust load is small and the bearing supposed to receive the thrust load can be downsized. As a result, the manufacturing costs of the turbomachine 100 may be reduced.

As illustrated in FIGS. 2 and 4, for example, the casing 70 includes the plurality of ribs 77 spaced apart from one another in a winding direction of the volute 73, which is the flow direction of the working fluid flowing through the volute 73. Each of the plurality of ribs 77 extends over the volute 73. For example, as the plurality of ribs 77, ribs 77a, 77b, 77c, 77d, 77e, 77f, 77g (the first rib), 77h, 77i, 77j, 77k, and 77m are arranged in this order from the start of the winding of the volute 73 to the end of the winding of the volute 73 along the winding direction of the volute 73.

As illustrated in FIG. 4, a height Hg of each of the one or more ribs 77g arranged in the diagonal area 79 is higher than a height Ha of the rib 77a arranged closest to the tongue portion 78 in the winding direction of the volute 73. Accordingly, the degree of the reinforcement of the diagonal area 79 is larger than the degree of the reinforcement of the tongue portion area 78a. Thus, variations in the deformation amount of the casing 70 in the axial direction of the rotating shaft 40 can be reduced relatively easily by adjusting the heights of the plurality of ribs 77. As a result, the tilting of the bearing 10 that occurs with the deformation of the casing 70 can be inhibited and the bearing 10 can exhibit high reliability. Further, when the casing 70 is manufactured by casting, the heights of the plurality of ribs 77 can be adjusted by adding a simple modification to the casting mold and thus, the manufacturing costs of the casing 70 can be reduced.

The height of the rib 77 arranged closest to the tongue portion 78 in the winding direction of the volute 73 is defined as H1 and the height of each of the one or more ribs 77 arranged in the diagonal area 79 is defined as H2. In this case, H2/H1 is not particularly limited as long as H2>H1, but is 1.1 to 5 for example. Thus, the tilting of the bearing 10 can be advantageously inhibited.

As illustrated in FIG. 4, a dimension Wg of each of the one or more ribs 77g arranged in the diagonal area 79 in the winding direction of the volute 73 is larger than a dimension Wa of the rib 77a in the winding direction of the volute 73. The rib 77a is included in the plurality of ribs 77 and arranged closest to the tongue portion 78 in the winding direction of the volute 73. Thus, the degree of the reinforcement of the diagonal area 79 is larger than the degree of the reinforcement of the tongue portion area 78a. Thus, variations in the deformation amount of the casing 70 in the axial direction of the rotating shaft 40 can be reduced relatively easily by adjusting the dimension of each of the plurality of ribs 77 in the winding direction of the volute 73. As a result, the tilting of the bearing 10 that occurs with the deformation of the casing 70 can be inhibited and the bearing 10 can exhibit high reliability. Further, when the casing 70 is manufactured by casting, the dimension of each of the plurality of ribs 77 in the winding direction of the volute 73 can be adjusted by adding a simple modification to the casting mold and thus, the manufacturing costs of the casing 70 can be reduced.

The dimension of the rib arranged closest to the tongue portion 78 in the winding direction of the volute 73, which is in the winding direction of the volute 73, is defined as W1 and the dimension of each of the one or more ribs 77 arranged in the diagonal area 79 in the winding direction of the volute 73 is defined as W2. In this case, W2/W1 is not particularly limited as long as W2>W1, but is 1.1 to 5 for example. Thus, the tilting of the bearing 10 can be advantageously inhibited.

As illustrated in FIG. 4, the rib 77g and the rib 77h are next to each other in the diagonal area 79 in the winding direction of the volute 73. The rib 77a and the rib 77b are next to each other in the tongue portion area 78a in the winding direction of the volute 73. A distance D2 between ends of the rib 77g and the rib 77h, which are located inside in the radial direction of the rotating shaft 40, is smaller than a distance D1 between ends of the rib 77a and the rib 77b, which are located inside in the radial direction of the rotating shaft 40. Thus, the degree of the reinforcement of the diagonal area 79 is larger than the degree of the reinforcement of the tongue portion area 78a. Thus, variations in the deformation amount of the casing 70 in the axial direction of the rotating shaft 40 can be reduced relatively easily by adjusting a distance between ends of the adjoining ribs 77, which are located inside in the radial direction of the rotating shaft 40. As a result, the tilting of the bearing 10 that occurs with the deformation of the casing 70 can be inhibited and the bearing 10 can exhibit high reliability.

As long as D1>D2, D2/D1 is not particularly limited but is 0.2 to 0.9 for example.

As illustrated in FIG. 4, the ribs 77 are arranged more closely in the diagonal area 79 than in the tongue portion area 78a. For example, the five ribs 77, that is, 77e, 77f, 77g, 77h, and 77i are arranged in the diagonal area 79. In contrast, the three ribs 77, that is, 77a, 77b, and 77m are arranged in the tongue portion area 78a. Thus, the degree of the reinforcement of the diagonal area 79 is larger than the degree of the reinforcement of the tongue portion area 78a. Thus, variations in the deformation amount of the casing 70 in the axial direction of the rotating shaft 40 can be reduced relatively easily by adjusting how closely the plurality of ribs 77 are arranged. As a result, the tilting of the bearing 10 that occurs with the deformation of the casing 70 can be inhibited and the bearing 10 can exhibit high reliability.

Although the description above focuses on the first casing 70a of the casing 70, the second casing 70b may also have a structure similar to the structure of the first casing 70a except that the winding direction of the volute 73 is in the reverse direction. Thus, the tilting of the bearing 10 can be inhibited and the bearing 10 can exhibit high reliability.

The turbomachine 100 can be changed in various points. For example, the turbomachine 100 may be changed into an expander, which generates power by expanding the working fluid. Even in this case, advantages similar to those described above can be obtained. The turbomachine 100 may be changed into a fluid machine structured by combining a compressor and an expander. Also in this case, advantages similar to those described above can be obtained.

In the turbomachine 100, the number of ribs included in the casing 70, which are the ribs 77, is not particularly limited. For example, the turbomachine 100 may be changed so that the casing 70 has a single rib only on the outer peripheral surface of the outer wall 74 in the diagonal area 79. Desirably, the casing 70 includes the plurality of ribs 77. For another example, the one or more ribs 77 may be arranged only in the diagonal area 79.

The turbomachine 100 may be changed so that the bearing 10 is positioned in relation to the casing 70 in the axial direction of the rotating shaft 40 by fixing the bearing 10 directly to the casing 70. For another example, as long as the bearing 10 is positioned in relation to the casing 70 in the axial direction of the rotating shaft 40, the turbomachine 100 may be changed so that a member different from the bearing casing 60 is arranged between the bearing 10 and the casing 70 together with the bearing casing 60. For another example, the turbomachine 100 may be changed so that a member different from the bearing casing 60 is arranged between the bearing 10 and the casing 70 instead of the bearing casing 60.

The turbomachine according to the present disclosure can be used particularly advantageously as a compressor of a refrigeration cycle apparatus utilized for air conditioning equipment, such as a turborefrigerator or an industrial air conditioner. In addition, the turbomachine according to the present disclosure has other applications, which include a turbocharger, a gas turbine, and a steam turbine.

What is claimed is:

1. A turbomachine comprising:
   a rotating shaft;
   an impeller that is fixed to the rotating shaft and that compresses or expands a working fluid by rotating around an axial line of the rotating shaft;
   a bearing that rotatably supports the rotating shaft; and
   a casing that is arranged around the impeller in a circumferential direction of the rotating shaft and that includes a volute therein, the volute being a fluid passage for the working fluid compressed or expanded by rotation of the impeller, the volute having a cross-sectional area increasing in a flow direction of the working fluid, wherein the casing has an outer wall that defines the volute, the casing includes a plurality of ribs that include a first rib and that are arranged on an outer peripheral surface of the outer wall, the outer peripheral surface of the outer wall includes a diagonal area and a tongue portion area, wherein when it is assumed to angularly divide the casing into quarters to define a first quadrant Q1, a second quadrant Q2, a third quadrant Q3, and a fourth quadrant Q4 in the circumferential direction of the rotating shaft so that the tongue portion is located angularly in the center of the third quadrant Q3, and part of the casing that belongs to the third quadrant Q3 corresponds to the tongue portion area and part of the casing that belongs to the first quadrant Q1 corresponds to the diagonal area, the first rib is arranged in the diagonal area, when seen from an axial direction of the rotating shaft, the tongue portion area includes a tongue portion that is in contact with a most upstream portion and a downstream portion of the volute, when seen from the axial direction of the rotating shaft, a center of the volute is located between the diagonal area and the tongue portion area, the plurality of ribs are spaced apart from each other in a winding direction of the volute and that each extend over the volute, a degree of reinforcement of the diagonal area by the plurality of ribs being greater than a degree of reinforcement of the tongue portion area by the plurality of ribs, the plurality of ribs are spaced apart from each other in the winding direction of the volute and that each extend over the volute, and the first rib has a largest height among the plurality of ribs.

2. The turbomachine according to claim 1, wherein the bearing is a fluid bearing that rotatably supports the rotating shaft in a state where a lubricating liquid is between an outer peripheral surface of the rotating shaft and a bearing surface of the bearing.

3. The turbomachine according to claim 2, wherein the lubricating liquid is the working fluid in a liquid phase.

4. The turbomachine according to claim 1, wherein the working fluid is water.

5. The turbomachine according to claim 1, wherein in the winding direction of the volute, a dimension of the first rib in the winding direction of the volute is larger than a dimension of the rib arranged closest to the tongue portion in the winding direction of the volute.

6. The turbomachine according to claim 1, wherein a distance between ends of first two ribs of the plurality of ribs, the ends of the first two ribs being located inside in a radial direction of the rotating shaft, the first two ribs being next to each other in the winding direction of the volute in the diagonal area, is smaller than a distance between ends of second two ribs of the plurality of ribs, the ends of the second two ribs being located inside in the radial direction of the rotating shaft, the second two ribs being next to each other in the winding direction of the volute in the tongue portion area.

7. The turbomachine according to claim 1, wherein the plurality of ribs are arranged more closely in the diagonal area than in the tongue portion area.

8. The turbomachine according to claim 1, wherein when seen from the axial direction of the rotating shaft, the center of the volute is defined as a point O, a half straight line that passes through the tongue portion is defined as a half straight line L while the point 0 serves as a base point, and $-45°<\theta 2<45°$ and $135°<\theta 1<225°$, where when the half straight line L is rotated by an angle θ while the point O serves as the center and a direction in which the cross-sectional area of the volute increases is positive, θ2 represents an angle at which the tongue portion area and the half straight line L overlap and θ1 represents an angle at which the diagonal area and the half straight line L overlap.

9. The turbomachine according to claim 1, wherein when seen from the axial direction of the rotating shaft, the first rib overlaps an imaginary line that passes through the center of the volute and the tongue portion.

10. The turbomachine according to claim 1, wherein the first rib has a dimension largest in the winding direction of the volute among the plurality of ribs.

* * * * *